United States Patent [19]
Park

[11] Patent Number: 5,748,357
[45] Date of Patent: May 5, 1998

[54] OPTICAL DETECTING APPARATUS

[75] Inventor: Chang Jin Park, Suwon, Rep. of Korea

[73] Assignee: Samsung Electro-Mechanics Co., Ltd., Suwon, Rep. of Korea

[21] Appl. No.: 691,939

[22] Filed: Aug. 5, 1996

[30] Foreign Application Priority Data

Nov. 30, 1995 [KR] Rep. of Korea ............... 95-45359

[51] Int. Cl.$^6$ .................................................. G02B 26/08
[52] U.S. Cl. ........................................ 359/216; 250/236
[58] Field of Search ............................. 359/216–219; 250/234–236; 347/256–261, 234–235, 243–244, 248–250

[56] References Cited

U.S. PATENT DOCUMENTS 5,546,215  8/1996  Ota ............................. 359/208

FOREIGN PATENT DOCUMENTS 56-164312  12/1981  Japan ............................. 359/216
62-8119    1/1987   Japan ............................. 359/216

*Primary Examiner*—James Phan
*Attorney, Agent, or Firm*—Ladas & Parry

[57] ABSTRACT

An optical detecting apparatus has a light source for emitting laser beams and a collimator and cylindrical lenses for collecting the laser beams. A mirror has first faces arranged in a polygon for rotating the mirror and reflecting some of the collected laser beams from the first faces, whereby each of the faces provides an effective width of scanning of the laser beams. Second faces also on the mirror respectively with the first faces are optically at a different angle from the first faces for reflecting others of the collected laser beams and an optical detector is spaced from the mirror for detecting the others of laser beams reflected from the second faces and producing synchronizing signals when the others of the collected laser beams reflected from the second faces are detected before or after the effective width of scanning.

5 Claims, 3 Drawing Sheets

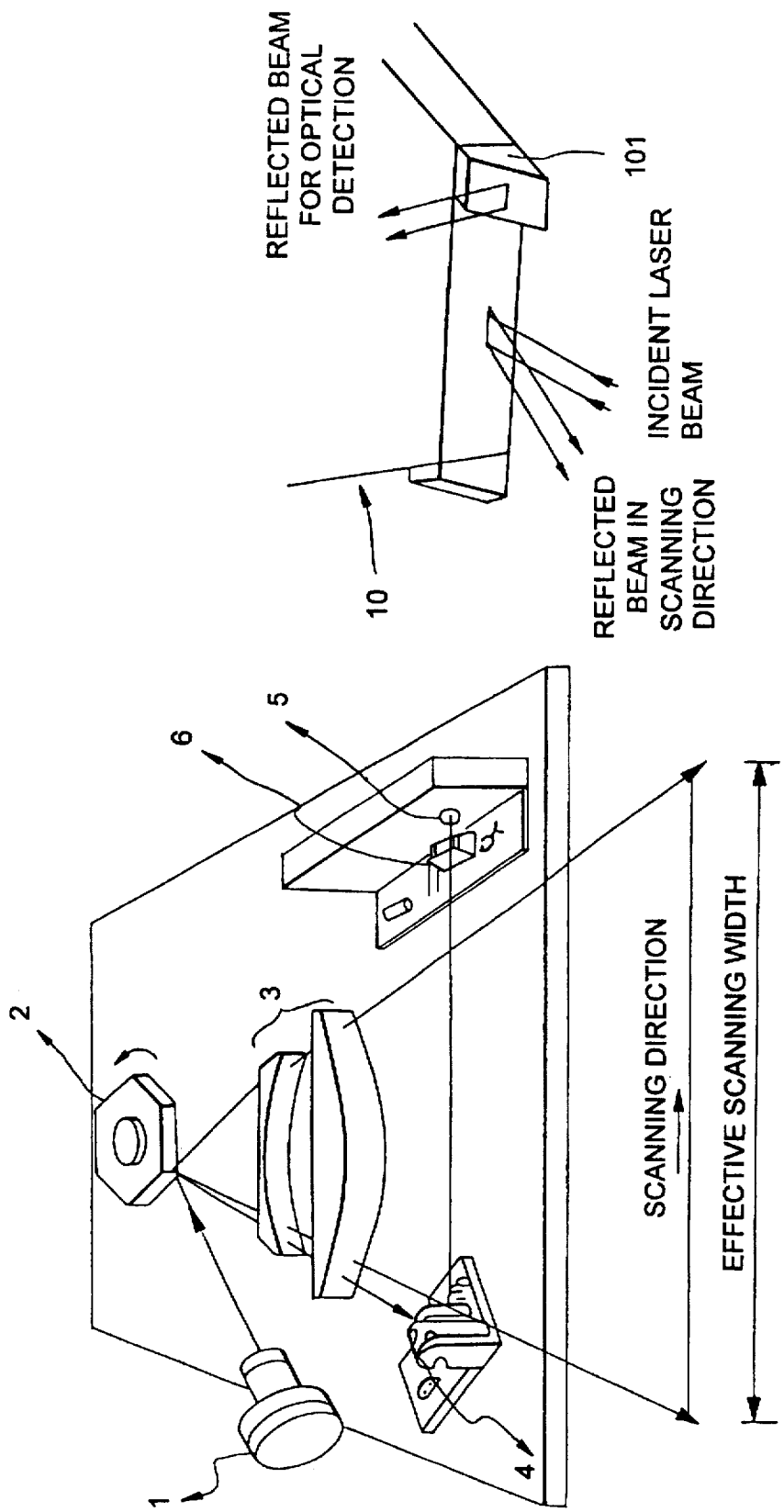
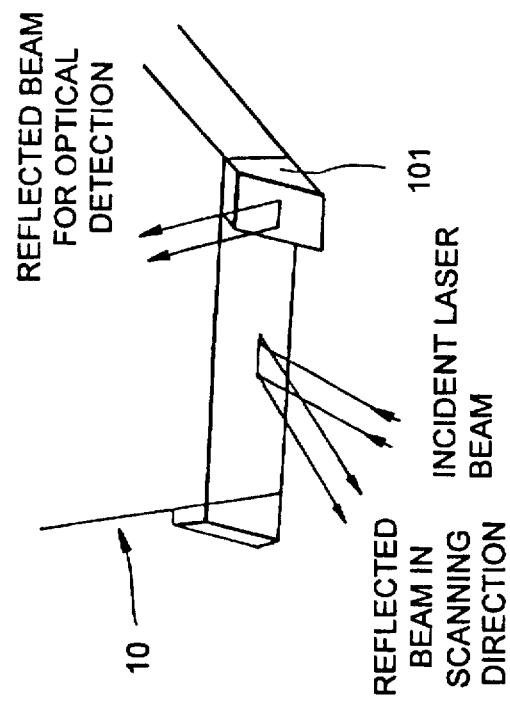
FIG. 1
PRIOR ART
FIG. 2A

OPTICAL DETECTING APPARATUS

BACKGROUND OF THE INVENTION

1. Field of the Invention

The present invention relates to an optical detecting apparatus, and more particularly, to an optical detector capable of simplifying the path of an optical reflecting beam.

2. Description of the Prior Art

In a laser beam printer which has been widely used, the laser scanning apparatus should employ a reflecting mirror and a condense lens for detecting light.

FIG. 1 is a perspective view of a conventional optical detecting apparatus. The apparatus comprises a light source 1 which is an assembly of laser diodes, a rotary polygon mirror 2 which rotates in the direction shown by an arrow, a scanning lens system having F-theta(F-θ) lens, a reflecting mirror 4 for detecting light, an optical detector 5, and a condense lens 6 for detecting light.

Referring to FIG. 1, the laser beam emitted from the light source 1 is reflected in the rotating direction by means of the rotary polygon mirror 2 having a plurality of planes.

At this time, a portion of the laser beam is reflected to the optical detector 5 by the reflecting mirror 4 immediately before and after starting of the effective scanning onto a photosensitive object. Specifically, since the laser beam emitted from the light source 1 is incident to the optical detector 5 after being condensed through the condense lens 6, a synchronizing signal is obtained by the optical detector 5 to detect the start of one scanning line.

According to the conventional optical detecting apparatus, a reflecting mirror 4 and a holder for mounting the mirror therein are required. In addition, a precise manufacturing process is required for the mirror to exactly reflect the beam in the direction of the optical detector, and the construction of the condense lens 6 and a slit for detecting light is necessary as the light path for the light detection is lengthened.

SUMMARY OF THE INVENTION

It is an object of the present invention to solve the problems involved in the prior art, and to provide an optical detecting apparatus which can reduce its manufacturing cost and manufacturing process with the reduction of inferior products by reducing the number of components of the optical system.

In order to achieve the above object, the present invention provides an optical detecting apparatus for use in a laser scanning device of a laser beam printer, comprising:

a light source for emitting a laser beams;

a lens system collecting the parallel laser beam emitted from the light source to one direction (subscanning direction);

a rotary polygon mirror for deflecting and reflecting in a direction opposite to its rotating direction the laser beams collected in one direction by the lens system; and an optical detecting means for detecting the light reflected from the rotary polygon mirror.

Preferably, the optical detecting means may be mounted on an upper or lower portion of the rotary polygon mirror, or installed on one side thereof.

It is also preferable that the rotary polygon mirror comprises protrusions formed on faces of the rotary polygon mirror, respectively, each protrusion having a surface inclined at a predetermined angle to a corresponding face of the rotary polygon mirror to reflect the incident laser beam to the optical detector, or cut portions having a surface inclined at the predetermined angle to corresponding faces of the polygon mirror to reflect the incident laser beam to the optical detector. Beam spitters may be attached to the surfaces of the polygon mirror, respectively, instead.

BRIEF DESCRIPTION OF THE DRAWINGS

For a better understanding of the present invention and to show more clearly how it may be carried into effect, reference will now be made, by way of example, to the accompanying drawings, which shows a preferred embodiment of the present invention, and in which:

FIG. 1 is a perspective view of a conventional optical detecting apparatus.

FIGS. 2A to 2C are schematic views showing the optical path of an optical detector according to an embodiment of the present invention, respectively.

DETAILED DESCRIPTION OF THE PREFERRED EMBODIMENTS

Figure 2B:
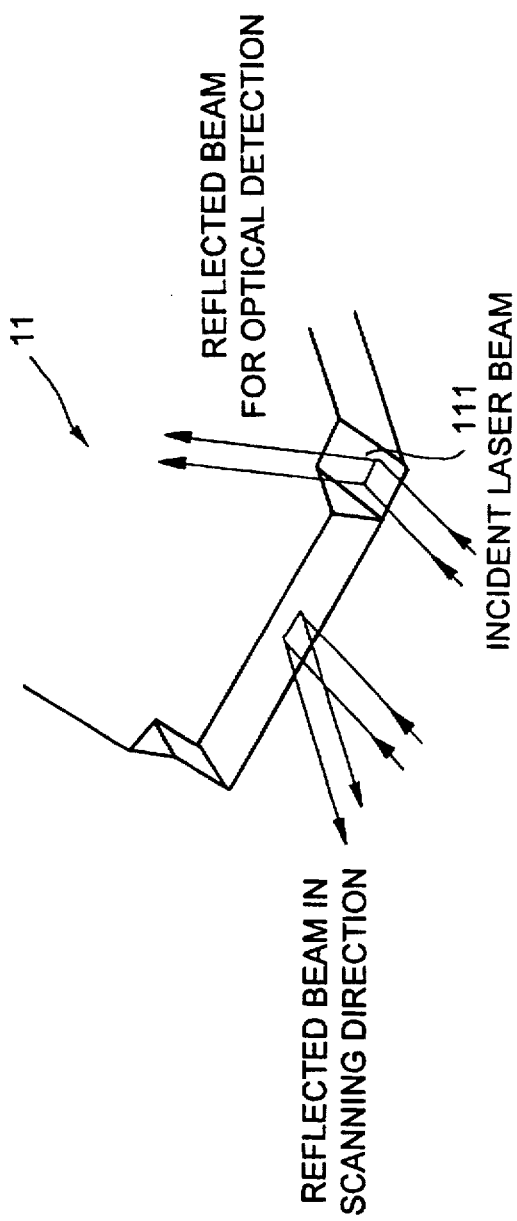

Hereinafter, an embodiment of the present invention will be described in detail.

The elements in the drawings provided with the same reference numerals have the same function. Thus, descriptions of the same elements are not included.

Concerning a laser scanning apparatus, it is a principal concept according to the present invention that the incidence of a laser beam into a optical detector is carried out by the reflection in the direction perpendicular to that of deflection of laser beam, which is the rotating direction of the rotary polygon mirrors 10, 11, 25, and in parallel or at a certain angle of inclination to the rotating axis so that the rotary polygon mirrors 10, 11, 25 having a vertical angle are cut and thus, they are shaped to have inclined angle with respect to the direction of projecting beams.

Figure 2C:
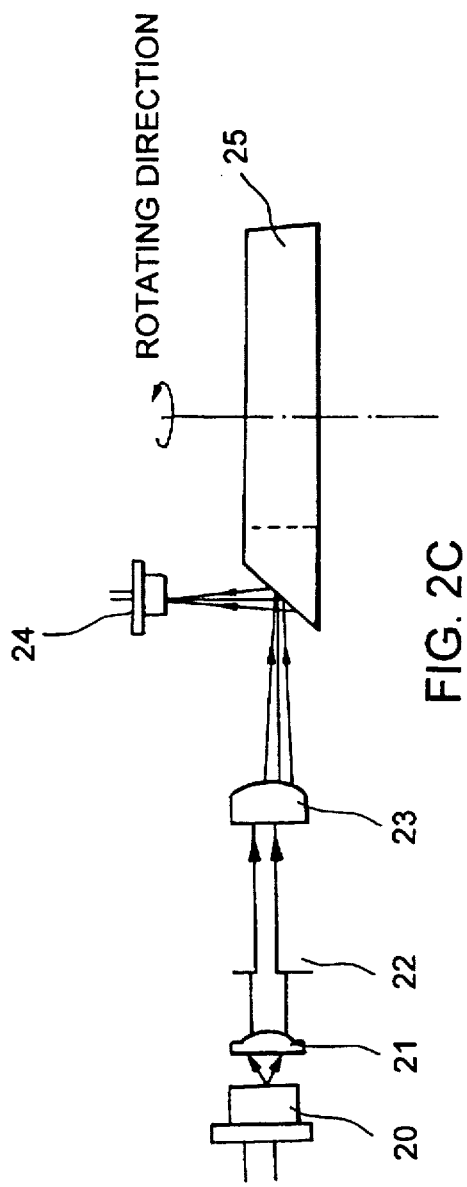
Figure 4:
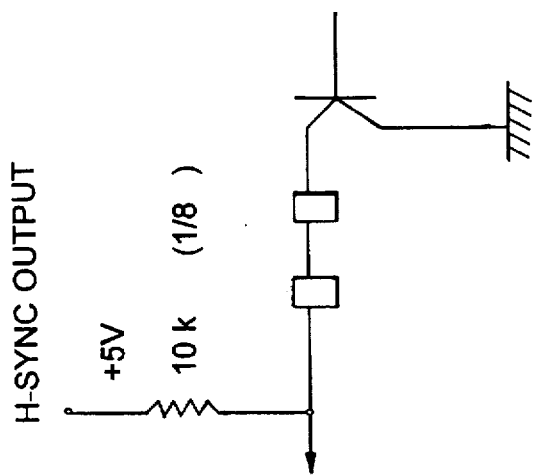
FIG. 4 is a schematic view of the horizontal synchronizing signal detecting circuit according to the present invention.

FIGS. 2A to 2C show an optical path of an optical detector and specific configurations according to an embodiment of the present invention, respectively. Specifically, FIG. 2A is a perspective view of a protrusive-type of rotary polygon mirror, FIG. 2B is a perspective view of a rotary polygon mirror at least part of which is cut from the initial square configuration, and FIG. 2C is a perspective view of an optical path which is in the subscanning direction with respect to the detecting light.

Referring to FIG. 2A, a rotary polygon mirror 10 is provided with protrusions 101 at each corner thereof. The protrusions 101 have reflecting faces inclined at a predetermined angle so that a part of the laser beam which is incident to the rotary polygon mirror could be transmitted to an optical detector 24 installed to the upper portion of the rotary polygon mirror as shown in FIG. 2C.

Preferably, the protrusions 101 are formed integrally with the rotary polygon mirror 10, but may be constructed by attaching optical elements of a beam splitter or a prism formation to a part of the conventional rotary polygon mirror 2.

While the protrusions 101 are provided on the rotary polygon mirror as shown in FIG. 2A, in order to make the optical detecting apparatus to be compact, a cut portion 111 may be formed at the rotary polygon mirror by cutting a part of each corner thereof. With respect to above mentioned cut portion 111, it may produce same function as the protrusion 101 shown in FIG. 2A by allowing the formation of the reflecting faces to be equivalent to that of the protrusions 101 shown in FIG. 2A.

Referring to FIG. 2C, the optical detector 24 of the present invention is disposed to the upper portion of the rotary polygon mirror 25 in which the protrusions 101 shown in FIG. 2A or the cut portions shown in FIG. 2B are provided.

Namely, as shown in FIG. 2C, a beam from a laser diode 20, serving as a source of light emitting a laser beam, is incident to the rotary polygon mirror 255 of the present invention by way of a collimator lens 21, a slit 22 and a cylindrical lens 23.

Figure 3B:
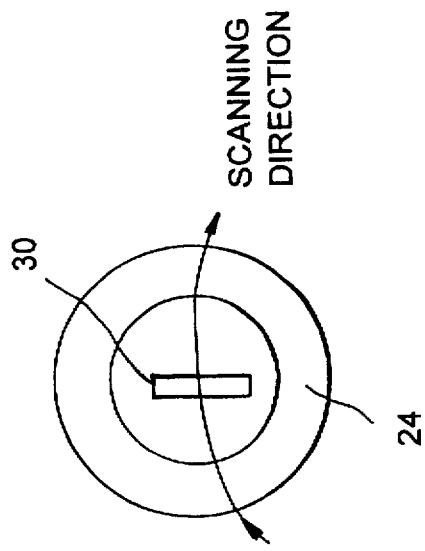
FIGS. 3A to 3B are schematic views showing the optical path incident to an optical detector according to an embodiment of the present invention, respectively.
Figure 3A:
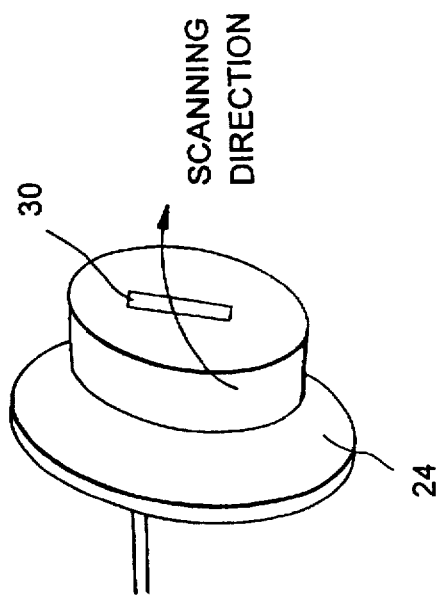

Since a parallel laser beam incident to the rotary polygon mirror concentrates into one direction (subscanning direction), an effective detecting face 30 of the optical detector 24 is established in a perpendicular direction of said direction as shown in FIG. 3A and 3B.

Thus, the optical detector 24 can detect the starting of the first scanning by a horizontal synchronizing signal detecting circuit.

This arrangement can provide a compensation effect with respect to the vibration when the rotary polygon mirror rotates, and can exclude the use of the conventional mirror and the focusing lens for the optical detector.

As mentioned above, the laser scanning apparatus for a laser beam printer in the present invention does not require a reflecting mirror for an optical detector, a holder adapted for supporting the reflecting mirror, and parts of a focusing lens which have been used for long time. As a result, advantageously, a manufacturer concerned can reduce the material cost for the laser scanning apparatus and the number of the manufacturing steps as well as the rate of defects caused by minimizing the number of optical parts during the manufacture.

While the present invention has been described and illustrated herein with reference to the preferred embodiments thereof, it will be understood by those skilled in the art that various changes in form and details may be made therein without departing from the spirit and scope of the invention.

For example, although it is described that the optical detector according to the present invention is located where the optical detector is installed to the upper portion of the rotary polygon mirror, it may be disposed to the lower portion or side of the rotary polygon mirror. In addition, the same effects from the present invention may be obtained if the reflecting faces are cut by allowing the direction of the laser beam reflected from the protrusions 101 or the cut portions 111 according to the embodiment of the present invention to be changed into the optical detector disposed to the lower portion or side of the rotary polygon mirror.

What is claimed is:

1. An optical detecting apparatus comprising:
   a light source for emitting laser beams;
   a collimator lens and a cylindrical lens for collecting the laser beams;
   a mirror having first faces arranged in a polygon for rotating the mirror and reflecting some of the collected laser beams from the first faces, whereby each of the faces provides an effective width of scanning of the laser beams;
   reflecting means on the mirror respectively with the first faces and having second faces optically at a different angle from the first faces for reflecting others of the collected laser beams; and
   an optical detector spaced from the mirror for detecting the others of the collected laser beams reflected from the second faces and producing synchronizing signals when the others of the collected laser beams reflected from the second faces are detected before or after the effective width of scanning.

2. The optical detecting apparatus as claimed in claim 1, wherein the reflecting means comprise protrusions respectively from the first faces at an end of the first faces leading the rotating of the mirror.

3. The optical detecting apparatus as claimed in claim 1, wherein the reflecting means are respectively inward of each of the first faces.

4. The optical detecting apparatus as claimed in claim 1, wherein the reflecting means comprise optical elements in the shape of prisms respectively on the first faces.

5. The optical detecting apparatus as claimed in claim 1, wherein the reflecting means comprise half-mirrors respectively combined with the first faces.

* * * * *